United States Patent
Suh et al.

(10) Patent No.: US 10,257,506 B2
(45) Date of Patent: Apr. 9, 2019

(54) METHOD OF OBTAINING DEPTH INFORMATION AND DISPLAY APPARATUS

(71) Applicant: SAMSUNG ELECTRONICS CO., LTD., Suwon-si (KR)

(72) Inventors: Sung Joo Suh, Seoul (KR); Chang Kyu Choi, Seongnam-si (KR); Du Sik Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 503 days.

(21) Appl. No.: 14/071,965

(22) Filed: Nov. 5, 2013

(65) Prior Publication Data
US 2014/0184754 A1 Jul. 3, 2014

(30) Foreign Application Priority Data

Dec. 28, 2012 (KR) .................. 10-2012-0156387
Jan. 28, 2013 (KR) .................. 10-2013-0009075

(51) Int. Cl.
*H04N 13/221* (2018.01)
*H04N 13/366* (2018.01)
*H04N 13/232* (2018.01)
*H04N 13/00* (2018.01)

(52) U.S. Cl.
CPC ......... *H04N 13/366* (2018.05); *H04N 13/232* (2018.05); *G02B 2207/129* (2013.01); *H04N 2013/0081* (2013.01)

(58) Field of Classification Search
None
See application file for complete search history.

(56) References Cited

U.S. PATENT DOCUMENTS

| | | | |
|---|---|---|---|
| 2002/0122124 A1* | 9/2002 | Suda | H04N 9/093 348/263 |
| 2002/0145114 A1 | 10/2002 | Inoue et al. | |
| 2003/0007667 A1 | 1/2003 | Ernst et al. | |
| 2009/0167922 A1* | 7/2009 | Perlman | H04N 5/357 348/340 |
| 2011/0019056 A1* | 1/2011 | Hirsch | G06F 3/0325 348/333.01 |
| 2012/0026140 A1* | 2/2012 | Chuang | G09G 3/3648 345/207 |
| 2012/0026160 A1* | 2/2012 | Suh | H04N 13/218 345/419 |

(Continued)

FOREIGN PATENT DOCUMENTS

| | | |
|---|---|---|
| CN | 102265627 A | 11/2011 |
| EP | 2 475 010 A1 | 7/2012 |

(Continued)

OTHER PUBLICATIONS

Matthew Hirsch et al., "BiDi: A Train, Depth-Sensing LCD for 3D Interaction using Light Fields", ACM Transactions of Graphics (TOG), vol. 28, No. 5, Dec. 1, 2009.

(Continued)

*Primary Examiner* — Chikaodili E Anyikire
(74) *Attorney, Agent, or Firm* — NSIP Law

(57) ABSTRACT

A method of obtaining depth information and a display apparatus may adjust a sensor area of a sensor panel based on a distance from an object, and may obtain depth information of the object based on the adjusted sensor area.

34 Claims, 14 Drawing Sheets

(56) References Cited

U.S. PATENT DOCUMENTS

| | | |
|---|---|---|
| 2012/0070070 A1 | 3/2012 | Litvak |
| 2012/0300095 A1 | 11/2012 | Sawada |
| 2012/0307093 A1* | 12/2012 | Miyoshi ............ G06T 5/50 348/218.1 |
| 2013/0300659 A1* | 11/2013 | Kang ............ G06F 3/017 345/158 |

FOREIGN PATENT DOCUMENTS

| | | |
|---|---|---|
| KR | 2000-0036863 | 7/2000 |
| KR | 10-2008-0051015 | 6/2008 |
| KR | 10-2010-0008677 | 1/2010 |
| KR | 10-2010-0064196 | 6/2010 |
| KR | 10-2010-0090961 | 8/2010 |
| KR | 10-2011-0134142 | 12/2011 |
| WO | WO 2011/149303 A2 | 12/2011 |
| WO | WO 2012/046270 A1 | 4/2012 |

OTHER PUBLICATIONS

European Search Report dated Jun. 13, 2014 in corresponding European Patent Application 13199749.6.
Chinese Office Action dated Feb. 3, 2016 in counterpart Chinese Application No. 201310744537.4. (28 pages in Chinese with English translation).
Japanese Office Action dated Jan. 30, 2018 in corresponding Japanese Patent Application No. 2013-256699 (2 pages in English and 4 pages in Japanese).

\* cited by examiner 210  220

670            680

Focused image

METHOD OF OBTAINING DEPTH INFORMATION AND DISPLAY APPARATUS

CROSS-REFERENCE TO RELATED APPLICATIONS

This application claims the priority benefit of Korean Patent Application No. 10-2012-0156387, filed on Dec. 28, 2012, and Korean Patent Application No. 10-2013-0009075, filed on Jan. 28, 2013, in the Korean Intellectual Property Office, the disclosures of which are incorporated herein by reference.

BACKGROUND

1. Field

One or more embodiments relate to a method of obtaining depth information and a display apparatus for performing the method.

2. Description of the Related Art

A three-dimensional (3D) image providing service is in the spotlight as a next generation multimedia service, and enables a user to perceive a 3D effect using images acquired from two or more views.

A method of achieving the 3D image providing service may employ a method of generating a 3D image by emitting light toward an object desired to be photographed using, for example, a camera. The amount of time for the light that is emitted to be reflected back to the source is then measured, and a depth of the object is calculated based on the measured amount of time.

SUMMARY

The foregoing and/or other aspects are achieved by providing a method of obtaining depth information, the method including: adjusting a sensor area of a sensor panel; and obtaining depth information of an object based on the adjusted sensor area.

The foregoing and/or other aspects are achieved by providing a method of obtaining depth information, the method including: estimating a reference distance; selecting sensor data from a sensor panel based on the reference distance; generating multi-view images of an object using the sensor data; and acquiring a depth image of the object using the multi-view images.

The foregoing and/or other aspects are achieved by providing a method of estimating depth information, the method including: estimating a reference distance; selecting sensor data from a sensor panel based on the reference distance; generating multi-view images of an object using the sensor data; generating a plurality of refocused images using the multi-view images; and acquiring a depth image of the object using the plurality of refocused images.

The foregoing and/or other aspects are achieved by providing a method of estimating depth information, the method including: generating multi-view images of an object using sensor data that is selected from the sensor panel based on a reference distance; generating a plurality of refocused images using the multi-view images; and acquiring a depth image of the object using the multi-view images and the plurality of refocused images.

The foregoing and/or other aspects are achieved by providing a display apparatus including: a reference distance estimating unit to estimate a reference distance; a sensor data selecting unit to select sensor data from a sensor panel based on the reference distance; a data decoding unit to generate multi-view images of an object using the sensor data; and a depth acquiring unit to acquire a depth image of the object using the multi-view images.

The foregoing and/or other aspects are achieved by providing a display apparatus including: a reference distance estimating unit to estimate a reference distance; a sensor data selecting unit to select sensor data from a sensor panel based on the reference distance; a data decoding unit to generate multi-view images of an object using the sensor data, and to generate a plurality of refocused images using the multi-view images; and a depth acquiring unit to acquire a depth image of the object using the plurality of refocused images.

The foregoing and/or other aspects are achieved by providing a display apparatus including: a data decoding unit to generate multi-view images of an object using sensor data that is selected from a sensor panel based on a reference distance, and to generate a plurality of refocused images using the multi-view images; and a depth acquiring unit to acquire a depth image of the object using the multi-view images and the plurality of refocused images.

The foregoing and/or other aspects are achieved by providing a display apparatus including a display panel having a plurality of pixels and a processor, to control the display panel to operate in a display mode during a first predetermined period of time and to operate in an image capturing mode during a second predetermined period of time.

The foregoing and/or other aspects are achieved by providing a method of obtaining depth information of an object using a display apparatus including a display panel and a sensor panel. The method includes estimating a reference distance, selecting sensor data from the sensor panel based on the reference distance, generating, by way of a processor, a first depth image by combining multi-view images generated using the sensor data, generating a second depth image by combining multi-view images acquired by combining refocused images generated using the multi-view images, and acquiring a depth image of the object by recombining the first depth image and the second depth image.

The foregoing and/or other aspects are achieved by providing a display apparatus including a display panel having a plurality of pixels, a sensor panel positioned behind the display panel for capturing an image, and a processor, to control the display panel to simultaneously display an image signal using the plurality of pixels and allow outside light to pass through the display panel to the sensor panel so that the sensor panel may capture an image using the outside light while the image signal is displayed by the display panel.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
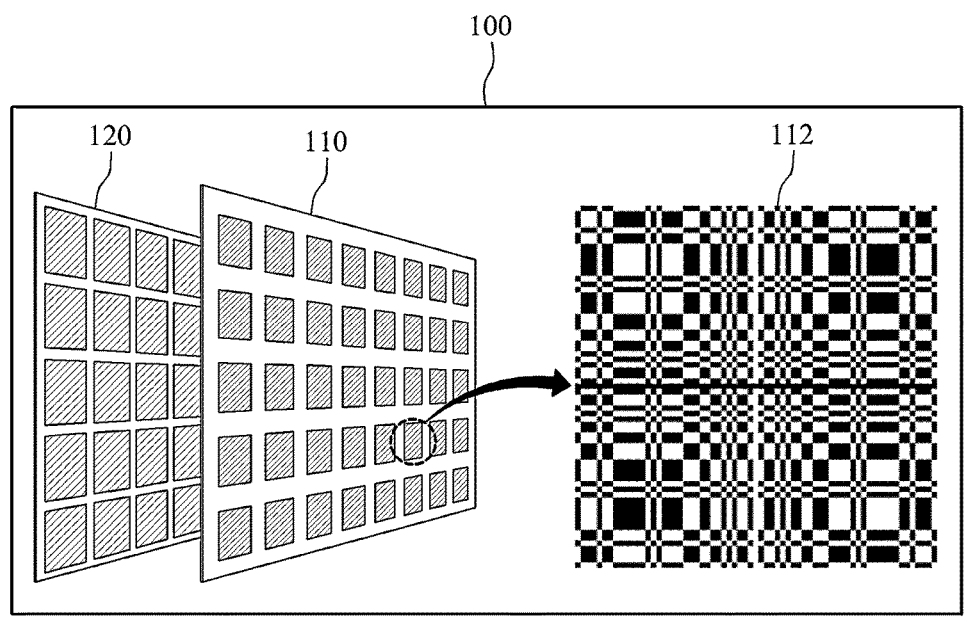
FIG. 1 illustrates a structure of a display apparatus for obtaining depth information according to an embodiment.

Reference will now be made in detail to embodiments, examples of which are illustrated in the accompanying drawings, wherein like reference numerals refer to the like elements throughout. Embodiments are described below to explain the present disclosure by referring to the figures.

A display apparatus according to an embodiment may include a display panel including an imaging pattern to make input light of an object pass through an aperture within the imaging pattern, and a sensor panel to detect data (hereinafter, sensor data) coded by the input light having passed through the imaging pattern and to restore an image of the object. The sensor panel may include an image capturing area as a maximum area in which the sensor data may be detected. A size of the image capturing area may be set to correspond to a size of the imaging pattern.

The display apparatus may select at least a portion of the image capturing area as a sensor area based on a distance from the object, for example, a distance between the object and the display panel. The sensor area may be an area for selecting sensor data to be actually used during a decoding processing process of restoring the image of the object.

A display apparatus according to an embodiment may generate an optimal depth image by variably selecting a sensor area based on a distance from an object.

FIG. 1 illustrates a structure of a display apparatus 100 for obtaining depth information according to an embodiment.

Referring to FIG. 1, the display apparatus 100 may include, for example, a display panel 110 and a sensor panel 120.

The display panel 110 may be a panel for displaying an image. For example, a panel including liquid crystal display (LCD) pixels or a panel including organic light emitting diode (LOD) pixels may be employed for the display panel 110. However, embodiments are not limited thereto. Depending on embodiments, the display panel 110 may allow input light from an outside to pass through the display panel 110 so that the sensor panel 120 may acquire sensor data based on the outside light. The sensor data may be data that is detected by a sensor included in the sensor panel 120.

In order to allow the input light to pass, the display panel 110 may include a plurality of imaging patterns 112. A process of forming the imaging pattern 112 may differ based on a type of a display pixel that makes up the display panel 110.

For example, when the display pixel is configured using an LCD pixel, the display panel 110 may optically form the imaging pattern 112 through a combination of LCD pixels. Here, the display panel 110 including a plurality of LCD pixels may make the input light pass by forming the imaging pattern 112 during a predetermined time period, for example, a predetermined time period in which an image signal such as a broadcast image signal is not being displayed.

For example, using a time division multiplexing scheme, the display panel 110, including the plurality of LCD pixels, may operate in a display mode during a predetermined period of time such as a first time slot and may operate in an image capturing mode during another predetermined period of time such as a second time slot.

In the display mode, the display panel 110 may display an image signal, such as a broadcast signal, using the plurality of LCD pixels. In the image capturing mode, the display panel 110 may form the imaging pattern 112 through an optical combination of LCD pixels, and may guide the input light from the outside to pass through the imaging pattern 112, so that the sensor panel 120 positioned behind the display panel 110 may detect sensor data.

The imaging pattern 112 formed through the optical combination of LCD pixels may be designed in a variety of ways by arranging an image (hereinafter, a transparent optical combination image) optically combined to be transparent and an image (hereinafter, an opaque optical combination image) optically combined to be opaque based on a predetermined rule.

As one example, the imaging pattern 112 may be designed as a pinhole pattern by arranging a plurality of opaque optical combination images around a transparent optical combination image. As another example, the imaging pattern 112 may be designed as a modified uniformly redundant array (MURA) pattern by alternately arranging a transparent optical combination image and an opaque optical combination image in a predetermined pattern. As another example, when the display pixel is configured using an OLED pixel, the display panel 110 may include imaging pattern 112, which may be predesigned in a panel manufacturing operation.

In a case of designing the imaging pattern 112, a portion of each of the OLED pixels that constitute the display panel 110 may include a transparent window to make the input light pass. An OLED pixel including a transparent window may be manufactured by adjusting a window within the OLED pixel to be transparent.

Another portion of each of the OLED pixels may include an opaque window to prevent the input light from passing. An OLED pixel including an opaque portion may be manufactured by adjusting a window within the OLED pixel to be opaque.

Figure 4:
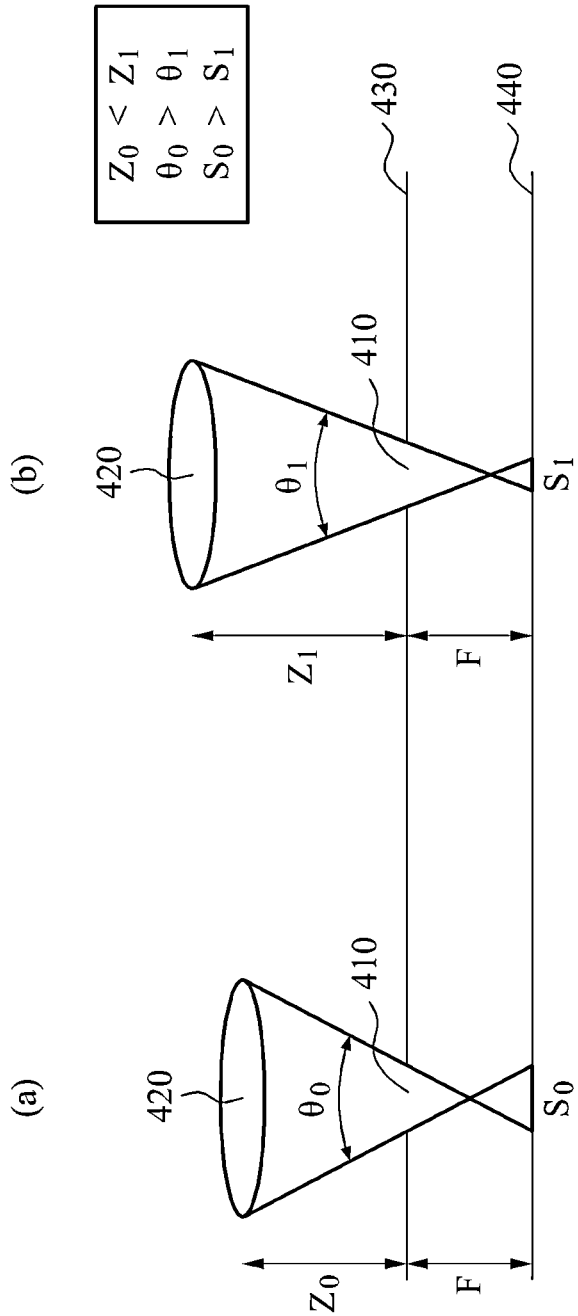
FIG. 4 illustrates an example of adjusting a size of a sensor area based on a distance from an object according to an embodiment.

The imaging pattern 112 may be variously designed by arranging the OLED pixel including the transparent window and the OLED pixel including the opaque window based on a predetermined rule. As one example, the imaging pattern 112 may be designed as a pinhole pattern by arranging a plurality of OLED pixels, each including the opaque window, to be around the OLED pixel including the transparent window. As another example, the imaging pattern 112 may be designed as a MURA pattern by alternately arranging the OLED pixel, including the transparent window, and the OLED pixel, including the opaque window, to be in a predetermined pattern. In FIG. 4, four-square MURA patterns are tiled for the imaging pattern 112 as an example.

The number of imaging patterns 112 and positions thereof in the display panel 110 may be determined based on a size of the display panel 110 for receiving the input light, a panel manufacturing environment, and the like.

In the passing of the input light using a time division multiplexing scheme, the display panel 110 including the plurality of OLED pixels may operate in a display mode during a predetermined period of time and may operate in an image capturing mode during another predetermined period of time.

In the display mode, the display panel 110 may display an image signal, such as a broadcast image signal, using the plurality of OLED pixels. In the image capturing mode, the display panel 110 may make the input light from the outside pass through the predesigned imaging pattern 112 included in the display panel 110, so that the sensor panel 120 positioned behind the display panel 110 may detect sensor data.

Also, in the case of the display panel 110 including the plurality of OLED pixels, since the imaging pattern 112 is included in the display panel 110, the display panel 110 may simultaneously display a broadcast image signal and make the input light pass through the display panel to the sensor panel 120, depending on embodiments.

For example, the display panel 110 including the plurality of OLED pixels may simultaneously display a broadcast image signal and make the input light pass using a transparent window or an opaque window included in an OLED pixel, without having to perform time division multiplexing. In this example, light for displaying a broadcast image signal may be reflected from the object and additionally input. Accordingly, the display panel 110 may make an additional quantity of input light pass, which may enhance the quality of sensor data detected at the sensor panel 120 positioned behind the display panel 110.

The input light that passes through the imaging pattern 112 of the display panel 110 may be coded as sensor data about an image. The sensor data may be detected by the sensor panel 120. For example, the sensor panel 120 may detect, from a plurality of image capturing areas, sensor data using the input light that passes through each imaging pattern 112.

The display apparatus 100 may generate a multi-view image by decoding the sensor data sensed by the sensor panel 120 and by recovering images of the object associated with the input light for the respective image capturing area.

The display apparatus 100 according to the embodiment may acquire a depth image even though a depth camera is not separately used.

Figure 2A:
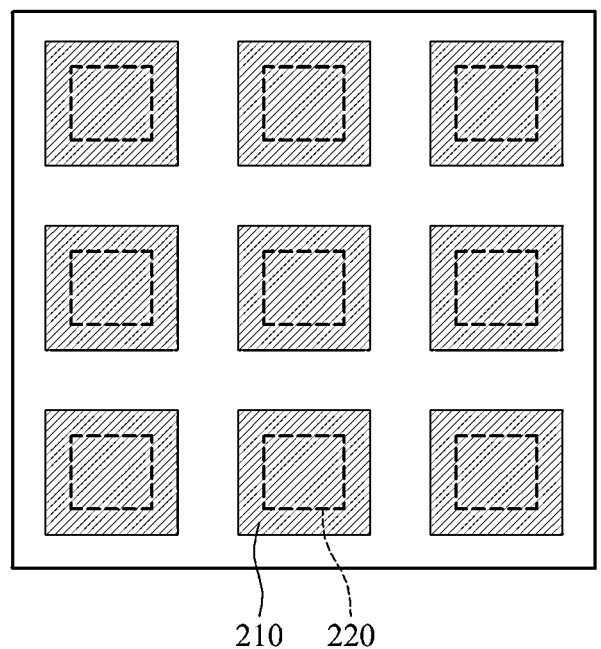
FIGS. 2A and 2B illustrate an example of a multi-view image and an image capturing area of a sensor panel according to an embodiment.
Figure 2B:
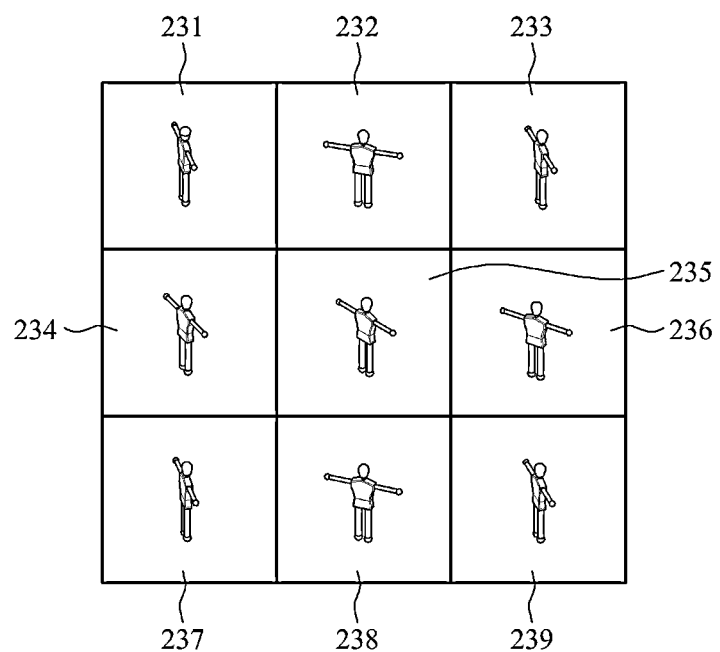

FIGS. 2A and 2B illustrate an example of a multi-view image and an image capturing area of a sensor according to an embodiment.

The term multi-view images as used herein may refer to a plurality of images that are acquired by changing a view with respect to a single object, and may be a general name of images that are generated in association with a plurality of image capturing areas. A display apparatus may generate, as the multi-view images, a plurality of images corresponding to the number of image capturing areas, by decoding sensor data that is detected in the individual image capturing areas.

In the case of detecting sensor data, a sensor panel may detect sensor data corresponding to the number of imaging patterns from input light that passes through an aperture, for example, a transparent window included in an OLED pixel, which is included in an imaging pattern.

FIG. 2A illustrates an example in which a display panel detects sensor data by input light that passes through nine imaging patterns in an image capturing area 210 of a sensor panel, for a case in which the display panel includes nine imaging patterns. For example, input light from an object may pass through nine imaging patterns at different angles, and the sensor panel may detect sensor data coded by the nine imaging patterns in nine image capturing areas 210.

Sensor data detected in the image capturing area 210 may be concentrated on a predetermined portion within the image capturing area 210 based on a distance from the object associated with the input light, for example, a distance between the object and the display panel. Accordingly, the display apparatus may select a sensor area 220 for determining sensor data to be actually decoded from the image capturing area 210 of the sensor panel based on the distance from the object.

For example, the display apparatus may initially estimate the distance from the object as a reference distance, and may select, as the sensor area 220, at least a portion of the image capturing area 210 of the sensor panel based on the reference distance. Estimating of the reference distance will be described later.

FIG. 2B illustrates an example of generating nine multi-view images including images 231, 232, 233, 234, 235, 236, 237, 238, and 239 by independently decoding sensor data within the sensor areas 220 selected from the respective nine image capturing areas 210.

Referring to FIG. 2B, the multi-view images 231, 232, 233, 234, 235, 236, 237, 238, and 239 may include a plurality of images that are acquired from a plurality of views with respect to a single object and thus, may correspond to the plurality of views, respectively.

For example, an image, such as the multi-view image 235, (hereinafter, referred to as a center image 235) generated at the center of the multi-view images 231, 232, 233, 234, 235, 236, 237, 238, and 239 may be generated by decoding sensor data that is detected in the image capturing area 220 positioned on the center of the sensor panel when the input light from the object passes through an imaging pattern at an angle close to verticality. A view of the center image 235 may be an angle that is observed from the front of the object.

Also, images, for example, the multi-view images 234 and 236 that are horizontally adjacent to the center image 235 may be generated to have a disparity at a horizontal view with the center image 235 and thus, may be acquired by observing the object on the left side and the right side of the center image 235.

Similarly, images, for example, the multi-view images 232 and 238 that are vertically adjacent to the center image 235 may be generated to have a disparity at a vertical view with the center image 235 and thus, may be acquired by observing the object from above or below of the center image 235.

Also, images, for example, the multi-view images 231, 233, 237, and 239 that are diagonally adjacent to the center image 235 may be generated to have a disparity at both a horizontal view and a vertical view with the center image 235. For example, the image corresponding to the multi-view image 231 may be acquired by acquiring the object from above on the left side of the center image 235.

The multi-view images 231, 232, 233, 234, 235, 236, 237, 238, and 239 may be generated by changing views from which the object is observed gradually based on the center image 235.

The multi-view images 231, 232, 233, 234, 235, 236, 237, 238, and 239 of FIG. 2B are proposed to merely as examples describe the embodiment and thus, other quantities of images may be used, depending on embodiments.

Figure 3:
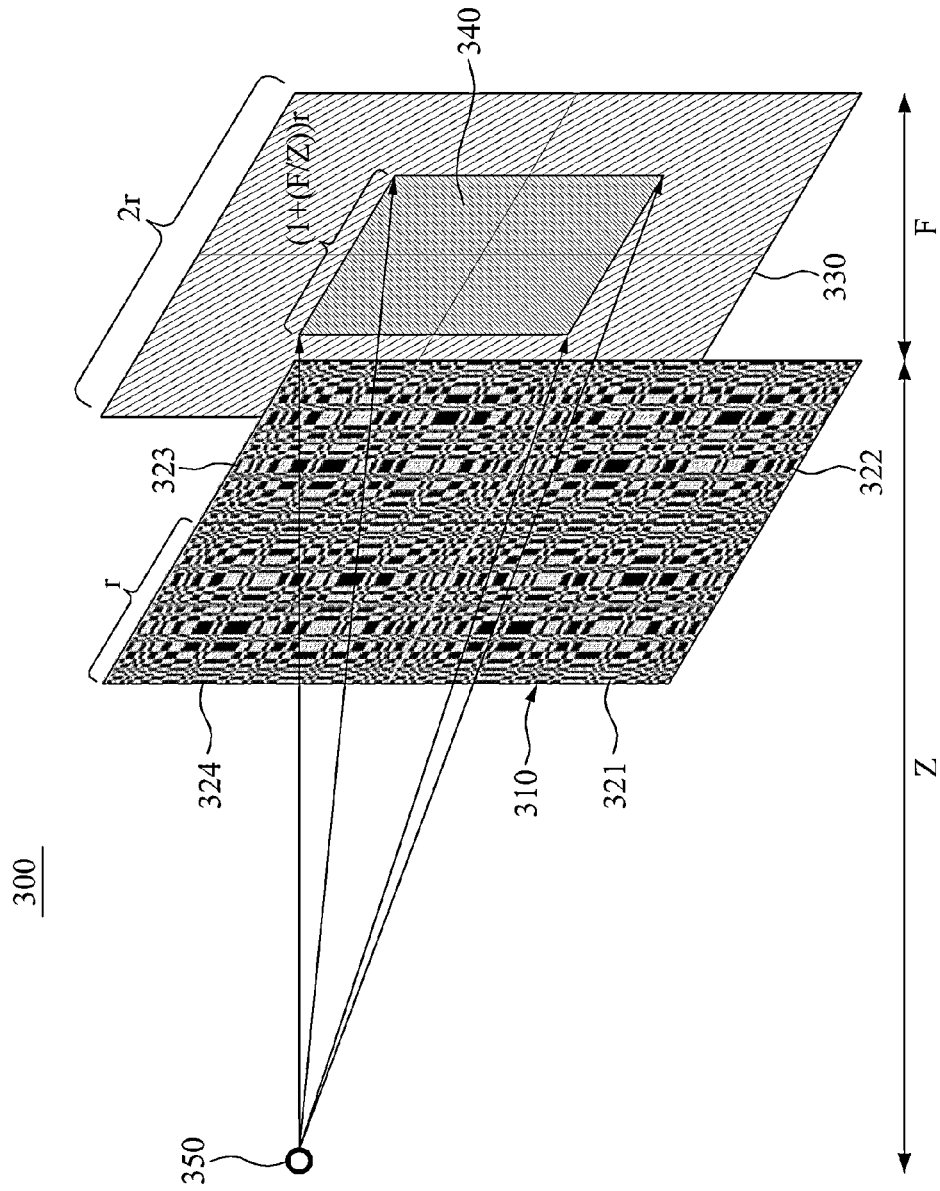
FIG. 3 illustrates a diagram to describe a relationship between a sensor area and an image capturing area for detecting sensor data according to an embodiment.

FIG. 3 illustrates a diagram to describe a relationship between a sensor area and an image capturing area for detecting sensor data according to an embodiment.

As described above, a display panel may include a plurality of imaging patterns. FIG. 3 illustrates a single imaging pattern 310. For example, the imaging pattern 310 may be configured by arranging four-square MURA patterns 321, 322, 323, and 324, each having a side with a length of "r."

The MURA patterns 321, 322, 323, and 324 enable sensor data to be detected at a sensor panel positioned behind the display panel by making input light from an object 350 pass through apertures formed within the MURA patterns 321, 322, 323, and 324. For example, the apertures may be OLED pixels including transparent windows. The detected sensor data may then be coded.

The sensor panel may include an image capturing area 330, and may detect, from the image capturing area 330, sensor data that is coded by the imaging pattern 310.

The imaging capturing area 330 may be a maximum area capable of detecting the sensor data. In FIG. 3, the imaging capturing area 330 may be set as a four-square area with one side of "2r" in correspondence to one side of the imaging pattern 310. Here, "r" denotes a length of one side of the MURA pattern, as described above.

A display apparatus 300, according to an embodiment, may select sensor data by adjusting a range of a sensor area 340 based on the distance from the object 350. Here, the sensor area 340 may denote an area included in the image capturing area 330, for example, an area used for acquiring a depth image in the image capturing area 330. Alternatively, for example, the sensor area 340 may denote an area in which sensor data is actually distributed in the image capturing area 330. Depending on embodiments, the range of the sensor area 340 may be determined based on the distance from the object 350.

For example, the display apparatus 300 may select at least a portion of the image capturing area 330 as the sensor area 340 using a distance between the object 350 and the display panel.

In FIG. 3, the distance between the object 350 and the display panel, for example, the distance from the object 350 is referred to as "Z". As described above, the display panel may include the imaging pattern 310.

A distance between the display panel and the sensor panel may be referred to as "F". Here, when the length of one side of the image capturing area 330 is "2r", the display apparatus 300 may select, from the image capturing area 330, the sensor area 340 having the length of one side as "(1+(F/Z))r" depending on embodiments.

As illustrated in FIG. 3, "(1+(F/Z))r" selected as the sensor area 340 may correspond to a length between a left end at which the input light passes through the MURA pattern 324 and reaches the image capturing area 330 and a right end at which the input light passes through the MURA pattern 323 and reaches the image capturing area 330, based on, for example, the distance from the object 350.

Sensor data that is generated by the input light may be concentrated on the sensor area 340 that is selected from the image capturing area 330 based on the distance from the object 350.

Depending on embodiments, the display apparatus 300 may select the sensor area 340 by adjusting the size of the sensor area 340 according to a change in the distance from the object 350. For example, according to an increase in the distance between the object 350 and the display panel, the display apparatus 300 may select the sensor area 340 by decreasing the size of the sensor area 340. Due to an increase of "Z" in "(1+(F/Z))r", the size of the sensor area 340 to be selected may be decreased.

On the contrary, according to a decrease in the distance between the object 350 and the display panel, the display apparatus 300 may select the sensor area 340 by increasing the size of the sensor 340. For example, due to a decrease of "Z" in "(1+(F/Z))r", the size of the sensor area 340 to be selected may be increased.

A plurality of sensor areas 340 may be determined to correspond to the number of imaging patterns 310. The display apparatus 300 may generate multi-view images of multiple views through decoding processing using sensor data belonging to the respective plurality of sensor areas 340.

According to an embodiment, by adjusting the size of the sensor area 340 based on the distance from the object 350, it is possible to generate a depth image of the object 350 that is positioned relatively far away from the display apparatus 300 and also to generate a depth image of the object 350 that is positioned relatively close to the display apparatus 300.

According to an embodiment, by recognizing a hand motion of a user and the like that is near the display apparatus 300 and by performing processing corresponding to the recognized hand motion, it is possible to provide a user with an interactive experience, such as a touch screen, for example.

According to an embodiment, the display apparatus 300 may provide an environment for generating multi-view images through decoding processing using sensor data within the sensor area 340 that is variably selected based on the distance from the object 350, and acquiring a depth image of the object 350 through a combination of the multi-view images.

FIG. 4 illustrates an example of adjusting a size of a sensor area based on a distance from an object 420 according to an embodiment.

An operation of adjusting a size of a sensor area based on a distance from an object 420 will be described with reference to FIG. 4.

FIG. 4 illustrates an example of comparing a size of a sensor area selected when a distance between the object 420 and a display panel 430 is $Z_0$ and a size of the sensor area selected when the distance between the object 420 and the display panel 430 is $Z_1$, which is greater than $Z_0$, in a case in which a distance between the display panel 430 and a sensor panel 440 is F.

In (a) of FIG. 4, a display apparatus may detect, from the sensor panel 440, sensor data about the object 420 that is positioned away from the display panel 430 by $Z_0$. Here, input light from the object 420 may pass through an aperture 410 of an imaging pattern at an angle $\theta_0$, and the display apparatus may detect the sensor data coded by the imaging pattern, within a range $S_0$ of the sensor panel 440. The display apparatus may select the range $S_0$ as the sensor area.

The angle $\theta_0$ may be calculated according to Equation 1.

$$\theta_0 = 2\arctan\left(\frac{S_0}{2F}\right)$$ [Equation 1]

In (b) of FIG. 4, the display apparatus may acquire an image of the object 420 that is positioned away from the display panel 430 by $Z_1$. Here, $Z_1$ may denote a distance from the display panel 430 greater than the distance $Z_0$ of FIG. 4(a).

The input light from the object 420 may pass through the aperture 410 of the imaging pattern at an angle $\theta_1$. Here, the angle $\theta_1$ may have a value less than $\theta_0$ of FIG. 4(a) as the distance $Z_1$ is relatively greater than the distance $\theta_0$.

The display apparatus may detect the sensor data coded by the imaging pattern within a range $S_1$ of the sensor panel 440. The display apparatus may select the above range $S_1$ as the sensor area. Here, $S_1$ may be less than $S_0$ of FIG. 4(a) due to a decrease in the angle at which the input light passes through the aperture 410.

For example, according to an increase in the distance from the object 420, the display apparatus may adjust the size of the sensor area to be decreased.

The angle $\theta_1$ may be calculated according to Equation 2.

$$\theta_1 = 2\arctan\left(\frac{S_1}{2F}\right)$$ [Equation 2]

The display apparatus may perform multi-view image recovery based on a distance from the object 420 by adjusting the size of the sensor area of the sensor panel 440 based on the distance from the object 420, and may provide an environment capable of estimating depth information for the object 420.

For example, the display apparatus may adjust the sensor area of the sensor panel 440 based on the distance from the object 420, and may obtain depth information of the object 420 based on the adjusted sensor area. Here, adjusting of the sensor area may indicate adjusting the size of the sensor area of the sensor panel 440 based on the distance from the object 420. For example, according to an increase in the distance from the object 420, the size of the sensor area may be decreased. On the contrary, according to a decrease in the distance from the object 420, the size of the sensor area may be increased.

Figure 5:
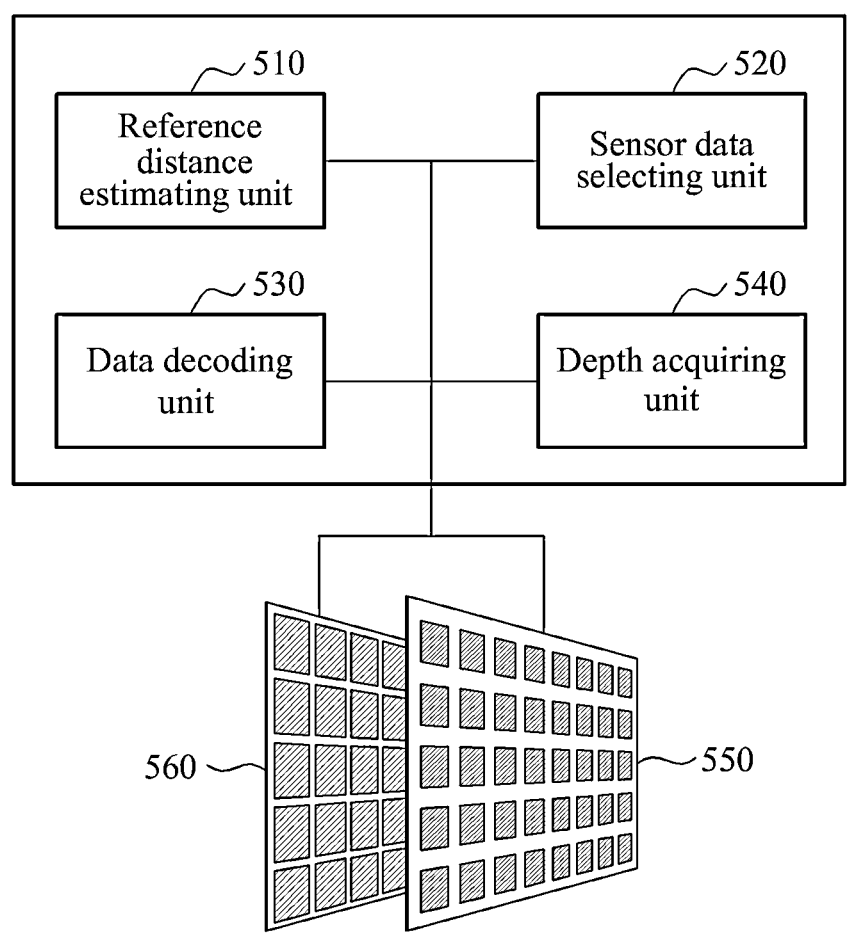
FIG. 5 illustrates a configuration of a display apparatus for obtaining depth information according to an embodiment.

FIG. 5 illustrates a configuration of a display apparatus 500 for obtaining depth information according to an embodiment.

In addition to a display panel 550 and a sensor panel 560, the display apparatus 500 may further include, for example, a reference distance estimating unit 510, a sensor data selecting unit 520, a data decoding unit 530, and a depth acquiring unit 540.

The reference distance estimating unit 510 may estimate a reference distance. The reference distance may be a distance used when the sensor data selecting unit 520 preferentially selects a sensor area by assuming that an object is positioned at a predetermined distance.

According to an embodiment, the reference distance estimating unit 510 may select a plurality of candidate distances, and may determine the reference distance among the plurality of candidate distances based on a degree of definition of an image that is generated in association with the sensor panel 560 in correspondence to each of the plurality of candidate distances.

For example, the reference distance estimating unit 510 may select a candidate sensor area from the sensor panel 560 with respect to each candidate distance, and may compare a degree of definition of a multi-view image that is generated by decoding sensor data of the selected candidate sensor area. Here, the reference distance estimating unit 510 may compare a degree of definition of a center image among multi-view images that are generated in association with the respective candidate distances. The center image may be an image that is generated by input light that passes through an aperture of an imaging pattern at an angle that approximates verticality, among the multi-view images. For example, the multi-view image 235 of FIG. 2 may correspond to the above center image.

The reference distance estimating unit 510 may determine, as a reference image, the center image having the highest degree of definition through the comparison, and may determine, as the reference distance, a candidate distance associated with generating the reference image. For example, the reference distance estimating unit 510 may determine that the degree of definition is high when a relatively small amount of blur is included in the image.

Depending on embodiments, the reference distance estimating unit 510 may select a first sensor area from the sensor panel 560 based on a selected first distance, and may determine a center image among multi-view images generated based on the first sensor area. Similarly, the reference distance estimating unit 510 may select a second sensor area from the sensor panel 560 based on a second distance different from the first distance, and may determine a center image among multi-view images generated based on the second sensor area. The reference distance estimating unit 510 may determine, as the reference distance, a distance associated with the reference image having a relatively excellent degree of definition, among the selected center images.

Figure 6A:
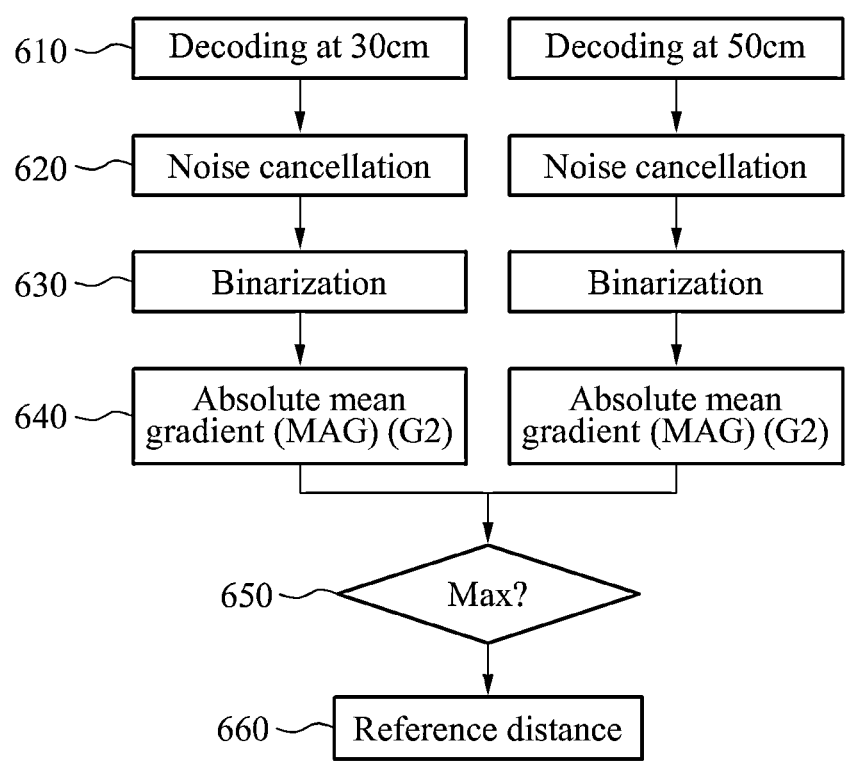
FIGS. 6A and 6B illustrate a method of determining a reference distance in order to select a sensor area according to an embodiment.
Figure 6B:
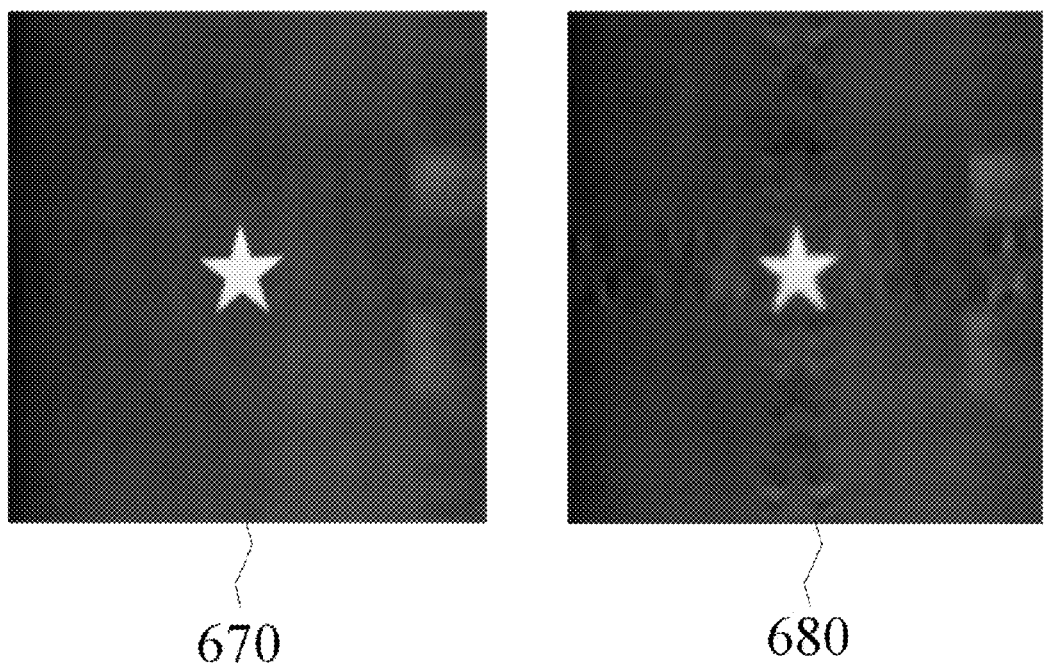

FIGS. 6A and 6B illustrate a method of determining a reference distance in order to select a sensor area according to an embodiment.

FIG. 6A illustrates an example of selecting a plurality of candidate sensor areas based on a plurality of candidate distances and determining a reference distance among the plurality of candidate distances based on a decoding processing result using sensor data within the selected candidate sensor areas.

The reference distance estimating unit 510 may select candidate sensor data based on the plurality of candidate distances, and may generate a first image by decoding the candidate sensor data. For example, as illustrated in FIGS. 6A and 6B, the reference distance estimating unit 510 may select candidate sensor areas with respect to candidate distances 30 cm and 50 cm, and may generate a first image 670 corresponding to the candidate distance 30 cm and a first image 680 corresponding to the candidate distance 50 cm, through decoding using candidate sensor data belonging to the selected candidate sensor areas in operation 610.

In operation 620, the reference distance estimating unit 510 may generate a second image by performing noise cancellation with respect to the first images 670 and 680. For example, the reference distance estimating unit 510 may perform noise cancellation with respect to the first images 670 and 680, using non-local means or the like.

In operation 630, the reference distance estimating unit 510 may generate a third image by performing binarization with respect to the second image.

According to an embodiment, the reference distance estimating unit 510 may compare a degree of definition between images that are generated by combining the first images 670 and 680 with respect to the respective candidate distances and the third image for which binarization is performed. For example, the reference distance estimating unit 510 may combine a sensor image, that is, the first image 670, with respect to the candidate distance 30 cm and the third image for which binarization is performed with respect to the candidate distance 30 cm. An image for which binarization is performed may have only two values, for example, "0" and "255" segmented with respect to each pixel. The reference distance estimating unit 510 may generate a combined image by performing, for example, an AND operation with respect to the first image 670 with respect to the candidate distance 30 cm and the third image for which binarization is performed with respect to the candidate distance 30 cm. The reference distance estimating unit 510 may generate combined images with respect to the candidate distances 30 cm and 50 cm, and may compare a degree of definition between the combined images.

For the above comparison, a mean absolute gradient (MAG) value of an edge area may be used in operation 640.

The reference distance estimating unit 510 may determine that the sensor image, for example, the first image 670 having an excellent MAG value, due to absence of blur, has a relatively high degree of definition in operation 650.

In operation 660, the reference distance estimating unit 510 may determine, as a reference image, the sensor image, for example, the first image 670 with respect to the candidate distance 30 cm, which is determined to have a relatively high degree of definition, and may determine, as a reference distance, a distance, for example, 30 cm, associated with the determined reference image.

Through estimation of the reference distance, the display apparatus may quickly select a sensor area based on an estimated reference distance in the case of acquiring a depth image of an object.

Referring again to FIG. 5, the sensor data selecting unit 520 may select, from the sensor panel 560, sensor data based on the reference distance. For example, the sensor data selecting unit 520 may select the sensor data based on a sensor area that is variably selected in association with the reference distance.

In the case of selecting sensor data, the sensor data selecting unit 520 may change the quantity of sensor data to be selected based on the reference distance. Here, the sensor data selecting unit 520 may decrease the quantity of sensor data to be selected according to an increase in the reference distance. On the contrary, the sensor data selecting unit 520 may increase the quantity of sensor data to be selected according to a decrease in the reference distance.

Figure 7:
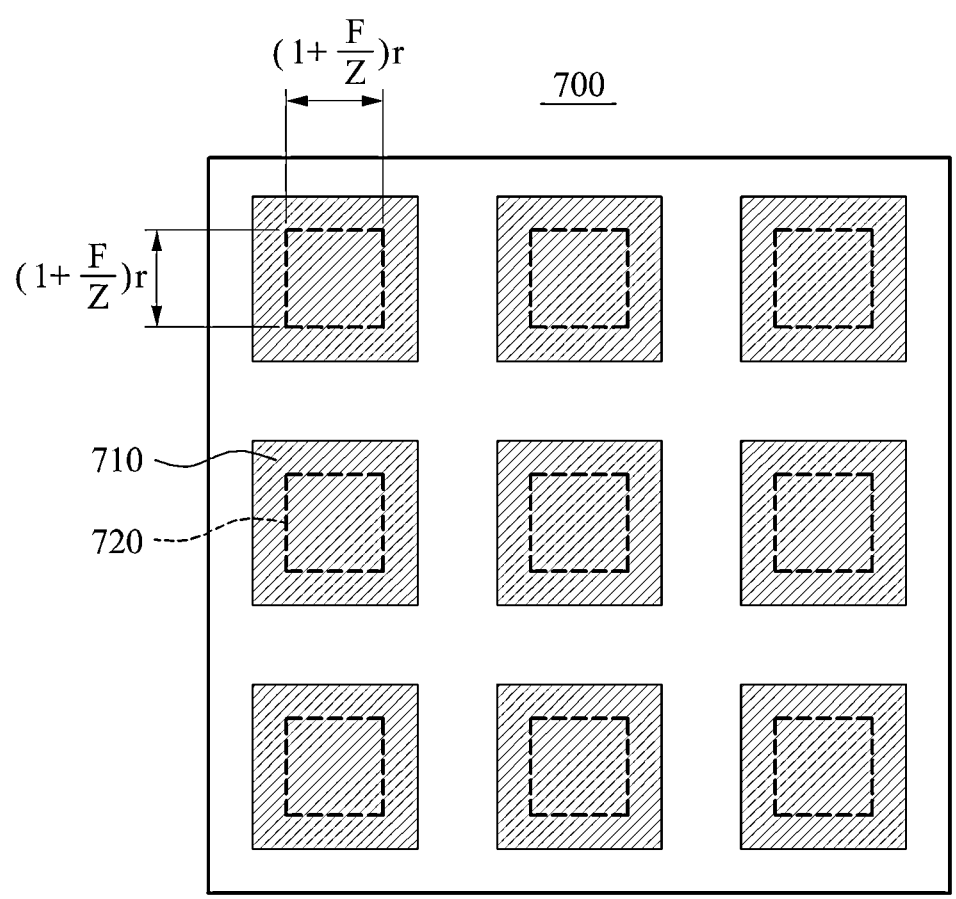
FIG. 7 illustrates an example of variably selecting sensor data detected on a sensor panel according to an embodiment.

FIG. 7 illustrates an example of variably selecting sensor data detected from a sensor panel 700 according to an embodiment.

As described above, the sensor panel 700 may detect sensor data corresponding to the number of imaging patterns from input light that passes through an aperture, for example, a transparent window of an OLED pixel of an imaging pattern. The imaging pattern may be configured by tiling four MURA patterns to be in a four-square form (see FIGS. 1 and 3).

FIG. 7 illustrates an example of detecting sensor data by input light that passes through nine imaging patterns from imaging capturing areas 710 of the sensor panel 700.

The sensor data selecting unit 520 may select sensor data to be actually decoded for recovering an image of an object by selecting a sensor area 720 from the image capturing area 710 based on the reference distance.

For example, when the reference distance is "Z", a distance between the display panel 550 and the sensor panel 5560 is "F", and a length of one side of each of four four-square MURA patterns is "r", the sensor area 720 may be a four-square of which one side has a length of "(1+(F/Z))r".

As it can be known from "(1+(F/Z))r", when "Z" increases according to an increase in the reference distance, the sensor data selecting unit 520 may select the length of one side of the sensor area 720 to be relatively shorter. On the contrary, when "Z" decreases according to a decrease in the reference distance, the sensor data selecting unit 520 may select the length of one side of the sensor area 720 to be relatively longer.

The number of sensor data included in the sensor area 720 may be expressed using the number of sensor pixels Rp.

The number of sensor pixels Rp may be determined according to Equation 3.

$$\text{round}\left[\frac{\left(1+\frac{F}{Z}\right)r}{S_p}\right] \quad \text{[Equation 3]}$$

Here, (1+(F/Z))r denotes the length of one side of the sensor area 720 selected by the sensor data selecting unit 520, and Sp denotes a pixel pitch.

The number of sensor pixels Rp according to Equation 3 may be a value obtained by rounding off a ratio of the pixel pitch of the sensor area 720 to the length of one side of the sensor area 720.

The number of sensor data included in the selected sensor area 720 may be expressed by the square of the number of sensor pixels Rp, for example, (Rp×Rp).

Referring to FIG. 7 and Equation 3, the sensor data selecting unit 520 may variably select the sensor area 720 from the image capturing area 710, or may select sensor data included in the sensor area 720 based on the reference distance that is estimated based on the distance from the object.

Referring again to FIG. 5, the data decoding unit 530 may generate multi-view images of an object using the sensor data. The data decoding unit 530 may generate the multi-view images, which are acquired by observing the object from a variety of views, by decoding and interpreting the selected sensor data (see FIG. 2B)

As an example of decoding the sensor data, the data decoding unit 530 may generate the multi-view images of the object by performing convolution with respect to sensor data and an imaging pattern. For example, the data decoding unit 530 may visualize and recover a plurality of images, which are generated by input light emitted from the object at various angles, by performing convolution with respect to sensor data included in a sensor area and a MURA pattern included in the imaging pattern.

The depth acquiring unit 540 may acquire a depth image of the object using the multi-view images. For example, the depth acquiring unit 540 may determine corresponding points of the object, and may acquire the depth image by matching the multi-view images using the corresponding units.

Figure 8A:
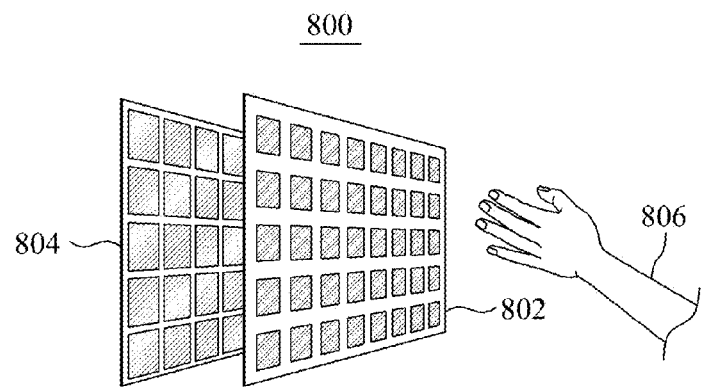
FIGS. 8A and 8B illustrate an example of obtaining a depth image by matching a multi-view image using a corresponding point.
Figure 8B:
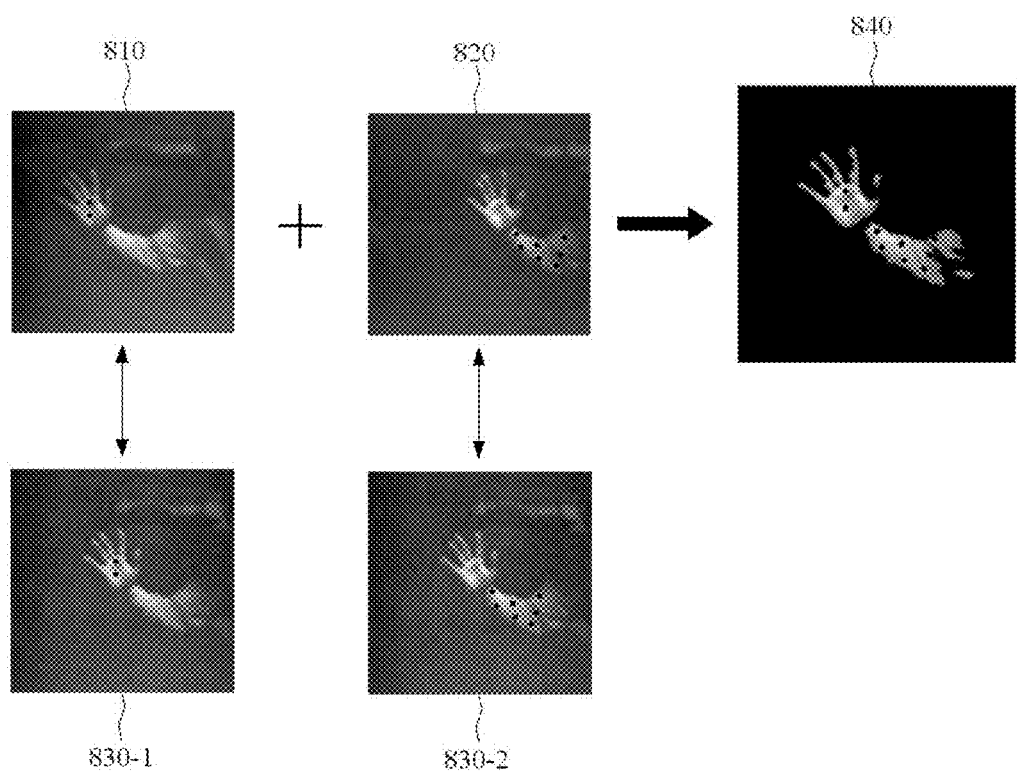

FIGS. 8A and 8B illustrate an example of obtaining a depth image by matching multi-view images using corresponding points.

FIG. 8A illustrates a display panel 802 and a sensor panel 804 for generating a multi-view image.

Referring to FIG. 8A, a display apparatus 800 may include the display panel 802 and the sensor panel 804, and may receive input light from an object 806, for example, a hand. The input light may be coded as sensor data about an image while passing through a plurality of imaging patterns included in the display panel 802. The sensor data may be detected on a plurality of image capturing areas of the sensor panel 804. In the case of performing decoding to generate the multi-view images, the sensor panel 804 may variably select, for each image capturing area, the quantity of sensor data to be used for the decoding. The data decoding unit 530 may generate the multi-view images, which are acquired by observing the object 806 from a variety of views, by decoding the selected senor data for the respective image capturing areas.

FIG. 8B illustrates an example of matching multi-view images to a single depth image.

The depth acquiring unit 540 may extract corresponding points of a predetermined portion of the object 806 from each of reference view images 830-1 and 830-2 of a reference view from which the object 806 is observed and a pair of multi-view images including a first multi-view image 810 and a second multi-view image 820, which each have a view that is different from the reference view. Here, the first multi-view image 810 may be an image captured from a left view with respect to the object 806, and the second multi-view image 820 may be an image captured from a right view with respect to the object 806. The reference view images 830-1 and 830-2 may be images captured from a center view with respect to the object 806.

The depth acquiring unit 540 may extract corresponding points from each of the reference view images 830-1 and 830-2, the first multi-view image 810, and the second multi-view image 820. For example, referring to FIG. 8B, the depth acquiring unit 540 may extract corresponding points by marking, as points, a predetermined feature portion of a palm on the first multi-view image and the reference view image 830-1. The depth acquiring unit 540 may extract corresponding points by marking, as points, a predetermined feature portion of a forearm on the second multi-view image 820 and the reference view image 830-2. In FIG. 8B, even though the predetermined number of corresponding points express the feature portions on the palm and the forearm, it is for ease of description and thus, a relatively large number of corresponding points or a relatively small number of corresponding points may be selected, as will be understood by those skilled in the art.

The depth acquiring unit 540 may adjust and thereby determine the feature portion of the palm marked on the first multi-view image 810 by referring to the feature portion marked on the reference view image 830-1. Similarly, the depth acquiring unit 540 may adjust and thereby determine the feature portion of the forearm marked on the second multi-view image 820 by referring to the feature portion marked on the reference view image 830-2.

The depth acquiring unit 540 may acquire a depth image 840 of the object 806 by combining the first multi-view image 810 in which the feature portion within the palm is marked and the second multi-view image 820 in which the feature portion within the forearm is marked. For example, the depth acquiring unit 540 may acquire the depth image 840 of the object 806 using the corresponding points between the first multi-view image 810 and the second multi-view image 820 or a corresponding area including the corresponding points. Example of obtaining the corresponding points may include a feature matching method, a stereo matching method, and the like. The depth acquiring unit 540 may obtain the corresponding points by flexibly employing the above methods based on an environment.

According to an embodiment, a display apparatus may identity corresponding points from a multi-view image that is generated in association with sensor data selected based on a reference distance, and may acquire a depth image of the object having depth information corresponding to the corresponding points.

According to an embodiment, a display apparatus may generate a refocused image using a multi-view image, and may acquire a depth image of an object using the refocused image.

The data decoding unit 530 may generate a plurality of refocused images using multi-view images. For example, the data decoding unit 530 may shift each of the multi-view images using a pixel unit, based on a center image among the multi-view images, and may generate, as a refocused image, an image overlapping the center image according to the shift. Each of the refocused images may be an image that sharply expresses a portion of the object based on a shifted pixel value.

Figure 9A:
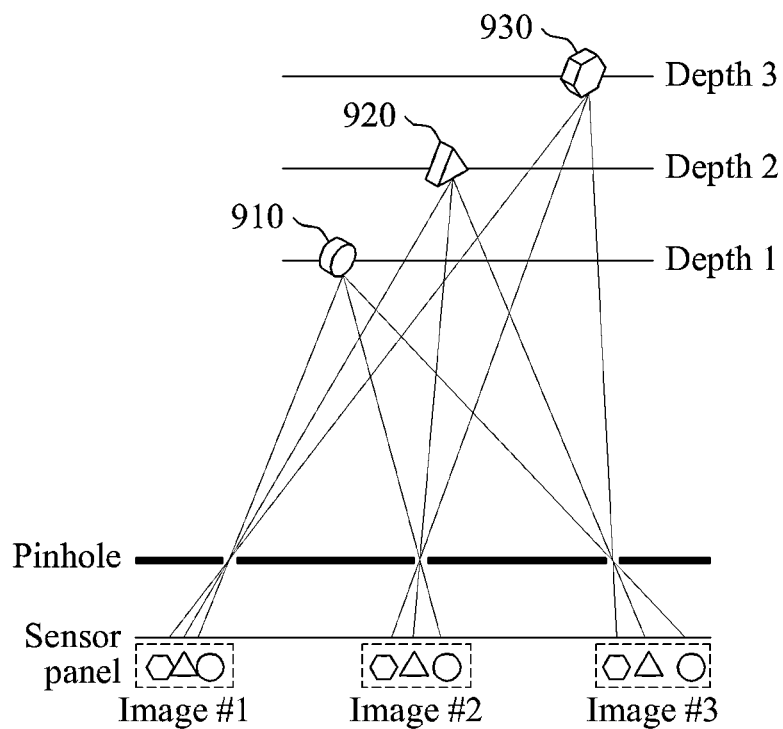
FIGS. 9A and 9B illustrate a concept of generating a refocused image using a multi-view image according to an embodiment.
Figure 9B:
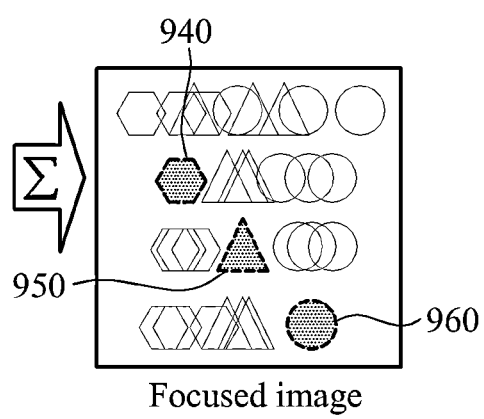

FIGS. 9A and 9B illustrate a concept of generating a refocused image using a multi-view image according to an embodiment.

FIG. 9A illustrates an example of detecting multi-view images, for example, a first image, a second image, and a third image, having depth information on a sensor panel when input light from each of a first object 910, a second object 920, and a third object 930 having different depths passes through a pinhole pattern. The pinhole pattern of FIG. 9A is an example of an imaging pattern and thus, another pattern may be alternatively used for the imaging pattern.

For example, due to a view disparity between a pinhole and each object, the sensor panel may sense, as different distances, inter-image distances associated with the first object 910, the second object 920, and the third object 930 within the multi-view images, for example, the first image, the second image, and the third image.

The data decoding unit 530 may shift the first image and third image using a pixel unit, based on a center image, for example, the second image among the multi-view images.

For example, referring to FIG. 9B, based on the center image, for example, the second image, the data decoding unit 530 may shift the first image to the right by three pixels, and may shift the third image to the left by three pixels. Accordingly, overlapping may occur between images associated with the third object 930 having the largest depth 3. The data decoding unit 530 may generate a refocused image 940 that sharply expresses the third object 930. Here, images associated with the first object 910 and the second object 920 may not complete refocusing due to a lack in an amount of shift required for overlapping.

Based on the second image corresponding to the center image, the data decoding unit 530 may shift the first image to the right by two pixels and may shift the third image to the left by two pixels. Accordingly, overlapping may occur in a space with an images associated with the second object 920 having an intermediate depth 2. The data decoding unit 530 may generate a refocused image 950 that sharply expresses the second object 920. Here, an image associated with the first object 910 may not complete refocusing due to a lack in an amount of shift required for overlapping. Also, an image associated with the third object 930 may not complete refocusing due to an excess in an amount of shift required for overlapping.

Based on the second image corresponding to the center image, the data decoding unit 530 may shift the first image to the right by a single pixel and may shift the third image to the left by a single pixel. Accordingly, overlapping may occur in a space with an image associated with the first object 910 having the smallest depth 1. The data decoding unit 530 may generate a refocused image 960 that sharply expresses the first object 910. Here, images associated with the second object 920 and the third object 930 may not complete refocusing due to an excess in an amount of shift required for overlapping.

As described above, the data decoding unit 530 may generate a refocused image that sharply expresses a portion of an object based on a shifted pixel value.

Figure 10:
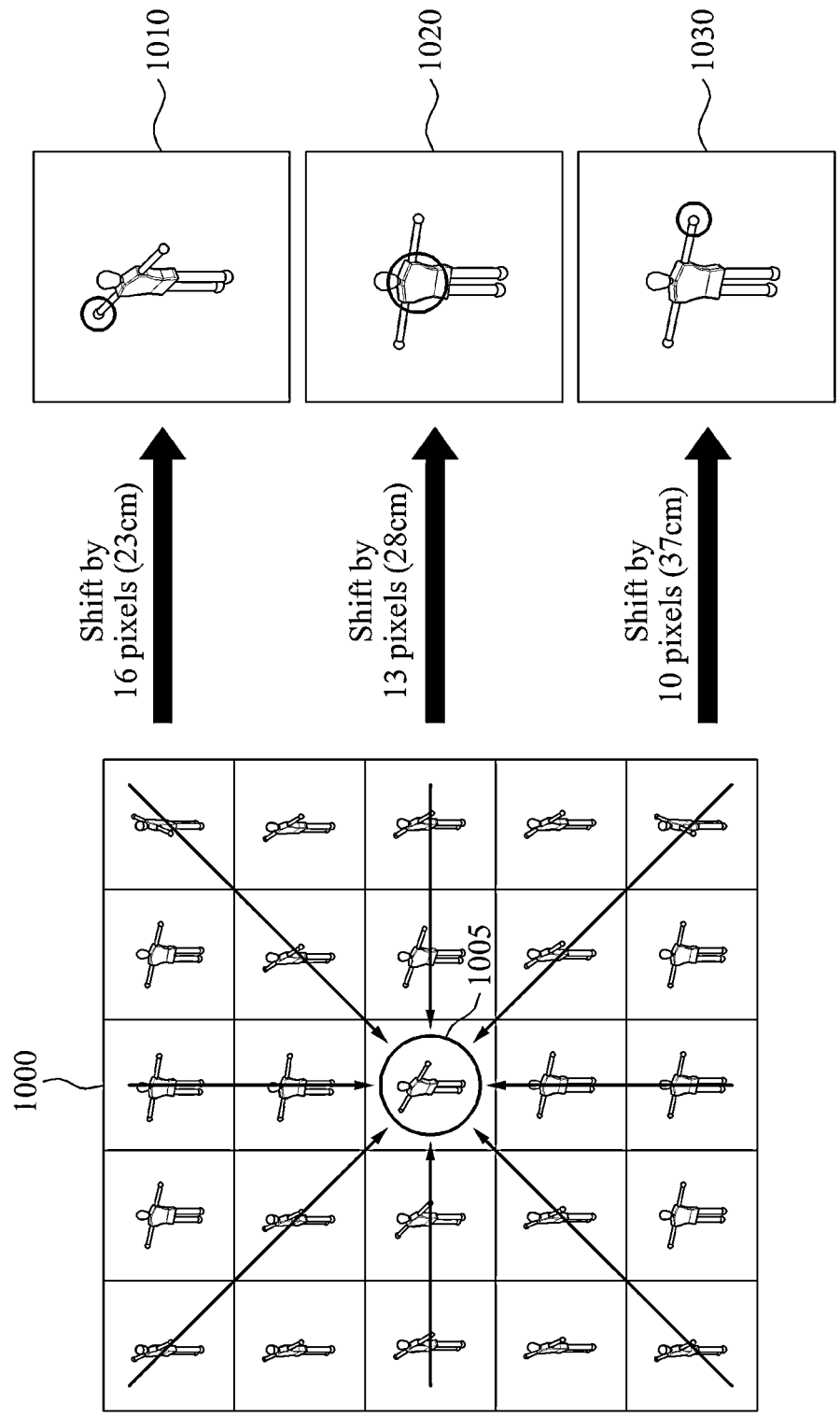
FIG. 10 illustrates an example of generating a refocused image using a multi-view image according to an embodiment.

FIG. 10 illustrates an example of generating a refocused image using a multi-view image according to an embodiment.

The reference distance estimating unit 510 may select a sensor area from a sensor panel based on a reference distance, and may generate a multi-view image 1000 based on the selected sensor area. Referring to FIG. 10, each of the multi-view images 1000 is shifted in, for example, a horizontal direction, a vertical direction, a diagonal direction, using a pixel unit, based on a center image 1005. The multi-view images 1000 may include 25 images.

For example, the data decoding unit 530 may generate, as a refocused image 1010, an image that overlaps the center image 1005 by shifting all of the multi-view images 1000 excluding the center image 1005 by 16 pixels, for example, about 23 cm based on the center image 1005. Here, the refocused image 100 may be an image in which a predetermined portion, for example, a left arm of an object is sharply expressed.

The data decoding unit 530 may generate, as a refocused image 1020, an image that overlaps the center image 1005 by shifting all of the multi-view images 1000 excluding the center image 1005 by 13 pixels, for example, about 28 cm based on the center image 1005. Here, the refocused image 1020 may be an image in which a predetermined portion, for example, a torso of the object is sharply expressed.

The data decoding unit 530 may generate, as a refocused image 1030, an image that overlaps the center image 1005 by shifting all of the multi-view images 1000 excluding the center image 1005 by 10 pixels, for example, about 37 cm based on the center image 1005. Here, the refocused image 1030 may be an image in which a predetermined portion, for example, a right arm of the object is sharply expressed.

Accordingly, the data decoding unit 530 may generate the plurality of refocused images 1010, 1020, and 1030, each sharply expressing a predetermined portion of the object, such as the left arm, the torso, and the right arm, for example.

The depth acquiring unit 540 may acquire a depth image of the object using the plurality of refocused images 1010, 1020, and 1030. For example, the depth acquiring unit 540 may determine a boundary in each of the refocused images 1010, 1020, and 1030, and may acquire the depth image by matching each of the refocused images 1010, 1020, and 1030 using the boundary.

Figure 11:
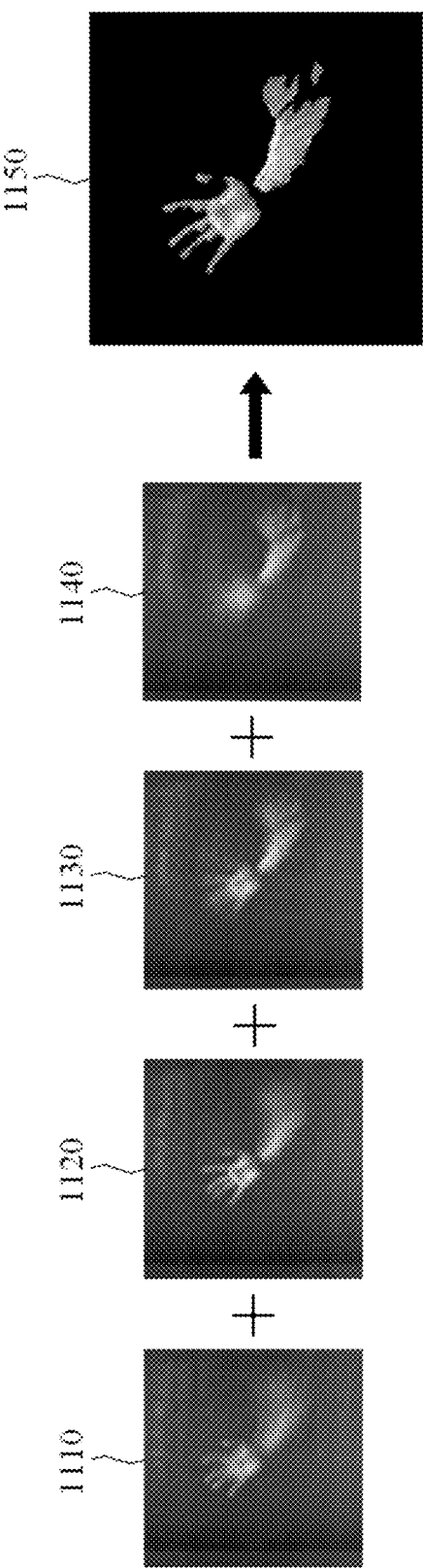
FIG. 11 illustrates an example of acquiring a depth image by matching a refocused image using a boundary according to an embodiment.

FIG. 11 illustrates an example of acquiring a depth image by matching a refocused image using a boundary according to an embodiment.

FIG. 11 illustrates an example of matching a plurality of refocused images into a single depth image.

The depth acquiring unit 540 may extract a boundary from each of the refocused images.

For example, the depth acquiring unit 540 may extract, from a first refocused image 1110 refocused on a finger of an object, a boundary image associated with an edge including the finger that is expressed to be relatively brighter. The depth acquiring unit 540 may extract, from a second refocused image 1120 refocused on a palm of the object, a boundary image associated with an edge including the palm that is expressed to be relatively brighter.

Similarly, the depth acquiring unit 540 may extract, from a third refocused image 1130 refocused on a wrist of the object and a fourth refocused image 1140 refocused on a forearm of the object, a boundary image associated with an edge including the wrist that is expressed to be relatively brighter and a boundary image associated with an edge including the forearm that is expressed to be relatively brighter, respectively.

The depth acquiring unit 540 may acquire a depth image 1150 of the object by combining the extracted boundary images associated with the edges into a single image based on edge sharpness. Here, a depth-from-focus (DFF) method, a boundary image matching method, and the like may be employed.

According to an embodiment, a display apparatus may acquire a depth image of an object that optimally expresses each portion of the object and has depth information, by generating and combining refocused images having relatively high edge values with respect to a predetermined portion of the object, using multi-view images generated in association with a reference distance.

According to another embodiment, a display apparatus may acquire a depth image that expresses the object more sharply, by recombining a first depth image acquired by combining multi-view images and a second depth image acquired by combining refocused images.

For the above operation, the depth acquiring unit 540 may acquire the depth image of the object using depth information associated with points of the multi-view images and depth information associated with edges of the refocused images.

For example, the depth acquiring unit 540 may generate the first depth image of the multi-view images by matching the multi-view images using corresponding points of the object, and may generate the second depth image of the refocused images by matching the refocused images using the boundaries within the refocused images.

Figure 12:
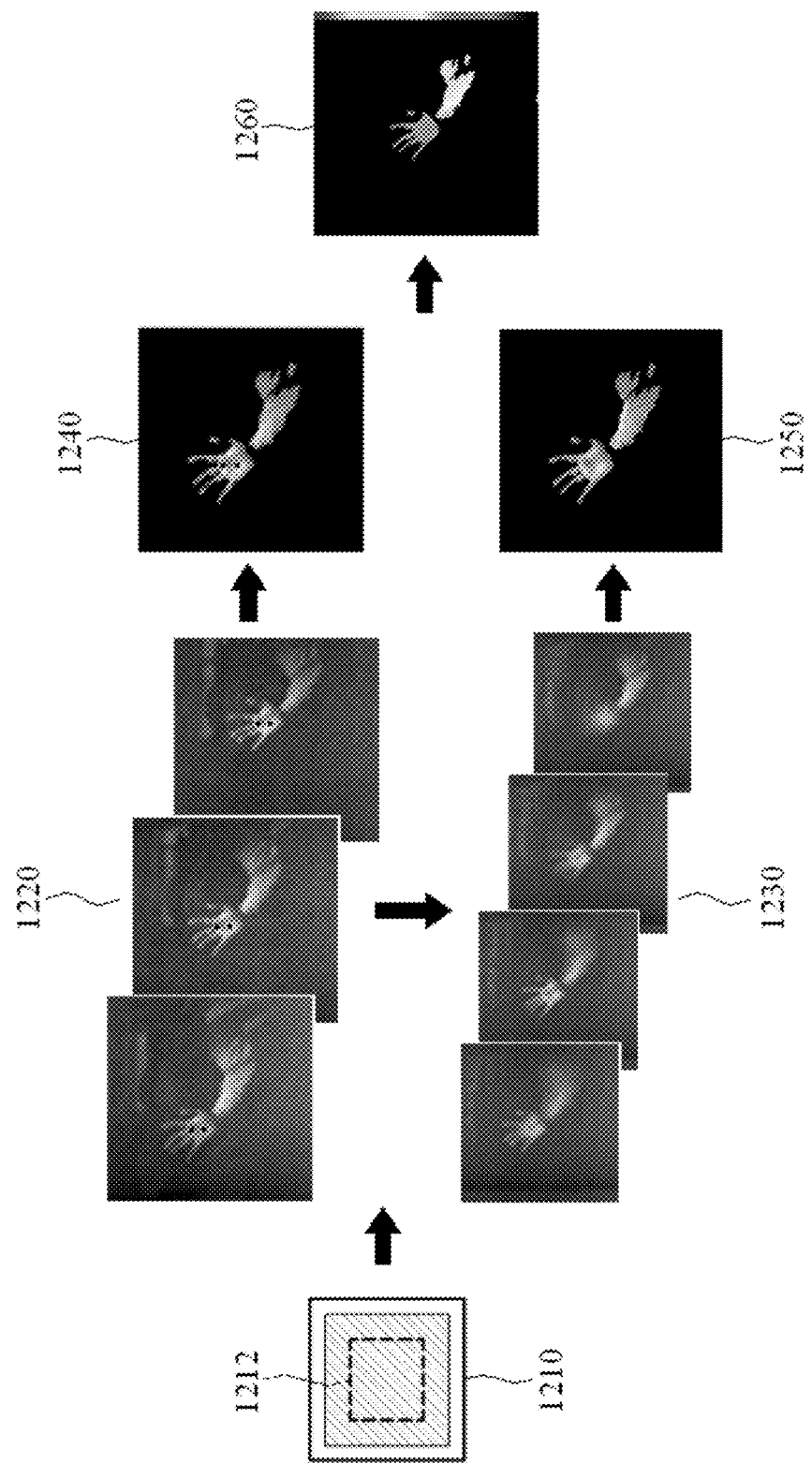
FIG. 12 illustrates an example of acquiring a depth image of an object by recombining a first depth image and a second depth image according to an embodiment.

FIG. 12 illustrates an example of acquiring a depth image of an object by recombining a first depth image and a second depth image according to an embodiment.

In operation 1210, a display apparatus including a sensor panel may select a sensor area 1212 from the sensor panel. For example, the display apparatus may detect, on the sensor panel, sensor data coded by input light from an object, for example, a hand of a person that passes through an imaging pattern, and may select, as the sensor area 1212 based on the reference distance, an area in which the sensor data is concentrated.

The sensor area 1212 may be selected to have a length of one side as "$(1+F/z)r$". Here, z denotes a distance between the object and the display panel, F denotes a distance between the display panel and the sensor panel, and r denotes a length of ½ side of an image capturing area.

In operation 1220, the display apparatus may generate a multi-view image associated with the selected sensor area 1212. For example, the display apparatus may select a plurality of sensor areas 1212 corresponding to the number of imaging patterns, and may generate multi-view images through decoding processing with respect to sensor data included in the plurality of sensor areas 1212.

In operation 1230, the display apparatus may generate a plurality of refocused images using the multi-view images. For example, the display apparatus may shift each of the multi-view images using a pixel unit, based on a center image among the multi-view images, and may generate, as a refocused image, an image that overlaps the center image according to the shift.

In operation 1240, the display apparatus may generate a first depth image of the multi-view images associated with corresponding points of the object by performing feature matching and the like with respect to the multi-view images generated in operation 1220. For example, the display apparatus may generate the first depth image having depth information associated with points of the multi-view images by extracting corresponding points of predetermined feature portions, for example, a palm, a wrist, and a forearm of the object from the multi-view images, and by combining partial images associated with the predetermined feature portions of the object.

In operation 1250, the display apparatus may generate a second depth image of the refocused images associated with boundaries by performing DFF and the like with respect to pixels of the refocused images generated in operation 1230. For example, the display apparatus may generate the second depth image having depth information associated with edges of the refocused images by extracting boundary images from the refocused images that are refocused on predetermined feature portions of the object, such as a finger, a palm, a wrist, and a forearm, for example, and by combining the boundary images.

In operation 1260, the display apparatus may generate a depth image of the object by recombining the first depth image and the second depth image. For example, the display apparatus may perform recombination to make it possible to express a boundary, for example, an edge between the hand and the arm, through the second depth image, and to express internal points of the hand and the arm of the object through the first depth image.

According to an embodiment, the display apparatus may generate a further precise depth image by variably selecting a sensor area from a coded sensor area using a coded aperture image of a lensless scheme, by generating multi-view images and refocused images, and by combining the multi-view images and the refocused images.

Hereinafter, an operation of a display apparatus for obtaining depth information will be described.

Figure 13:
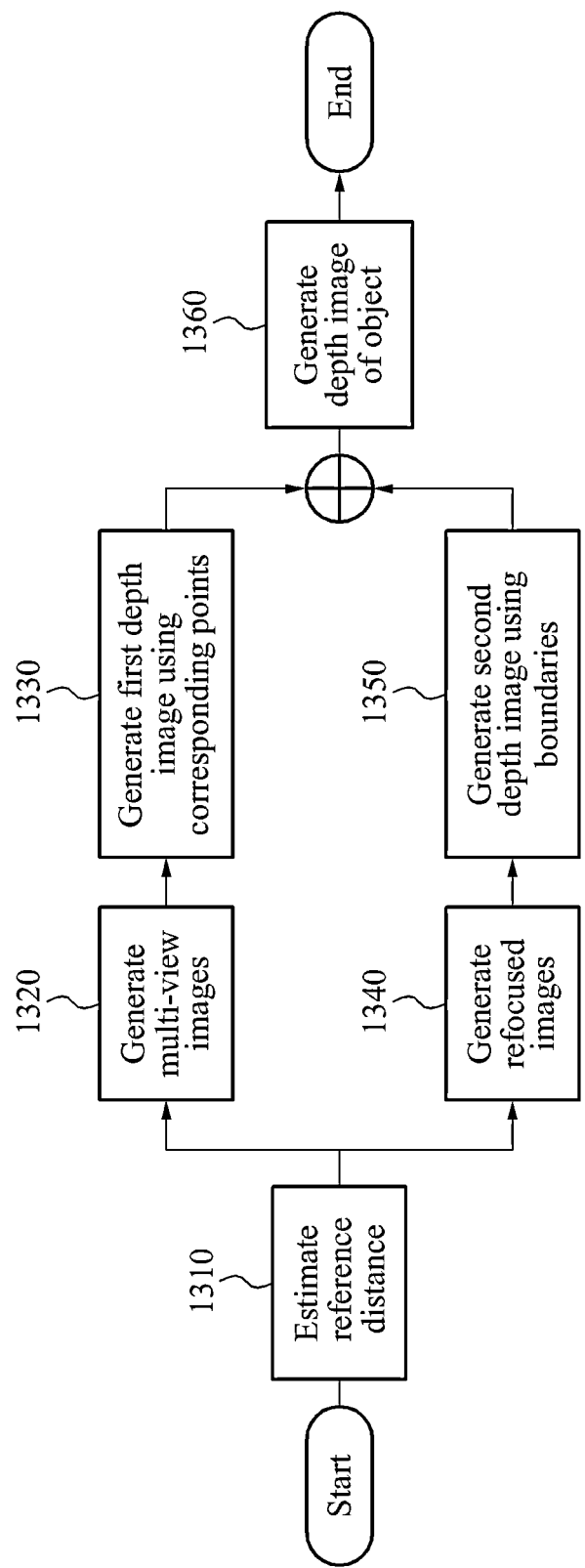
FIG. 13 illustrates a method of obtaining depth information using a display apparatus according to an embodiment.

FIG. 13 illustrates a method of obtaining depth information using a display apparatus according to an embodiment.

The depth information obtaining method of FIG. 13 may be performed, for example, by the display apparatus 500 of FIG. 5 that includes the display panel 550 and the sensor panel 560.

According to an embodiment, the display apparatus 500 may obtain depth information about points within multi-view images.

In operation 1310, the display apparatus 500 may estimate a reference distance. In operation 1310, the display apparatus 500 may determine the reference distance used to preferentially select a sensor area, based on the assumption that an object is positioned at a predetermined distance. According to an embodiment, when determining a size of a sensor area within an image capturing area based on a distance from the object, a distance used to determine the size of the sensor area may be estimated in operation 1310.

Here, the display apparatus 500 may select a plurality of candidate distances, and may determine the reference distance among the plurality of candidate distances based on a degree of definition of an image that is generated in association with the sensor panel 560, in correspondence to each of the plurality of candidate distances. The candidate distance may be a value that is obtained by estimating a distance from the display apparatus 500 to the object.

The display apparatus 500 may select a candidate sensor area from the sensor panel 560 with respect to each candidate distance, and may compare a degree of definition between multi-view images by decoding sensor data of the selected candidate sensor areas. Here, the display apparatus 500 may calculate a MAG value as a degree of definition of a multi-view image that is generated using sensor data of a candidate sensor area. For example, the display apparatus 500 may determine that a multi-view image, which is determined to include a relatively small amount of blurs due to an excellent MAG value, has a relatively high degree of definition.

Accordingly, the display apparatus 500 may determine, as a reference image, the multi-view image that is determined to have a relatively high degree of definition, and may determine, as the reference distance, a distance associated with the reference image.

In operation 1320, the display apparatus 500 may select sensor data from the sensor panel 560 based on the reference distance, and may generate multi-view images of the object using the selected sensor data. In operation 1320, the display apparatus 500 may select the sensor data based on the sensor area that is variably selected in association with the reference distance.

Here, the display apparatus 500 may change the number of sensor data to be selected based on the reference distance. The display apparatus 500 may decrease the number of sensor data to be selected according to an increase in the reference distance. On the contrary, the display apparatus 500 may increase the number of sensor data to be selected according to a decrease in the reference distance.

In operation 1320, the display apparatus 500 may generate the multi-view images of the object by performing convolution with respect to the sensor data and an imaging pattern. For example, the display apparatus 500 may visualize and thereby recover a plurality of images that are generated by input light emitted from the object at a variety of angles by performing the convolution with respect to the sensor data included in a sensor area and a MURA pattern included in the imaging pattern and decoding the sensor data.

In operation 1330, the display apparatus 500 may generate a first depth image from the multi-view images using corresponding points. In operation 1330, the display apparatus 500 may generate depth information associated with points of the multi-view images. For example, the display apparatus 500 may generate the first depth image of the multi-view images by matching the respective multi-view images using the corresponding points of the object.

For example, as described above with reference to FIG. 8B, the display apparatus 500 may acquire the first depth image of the object by combining partial images associated with the palm, the wrist, and the forearm of the object that are extracted from three multi-view images as corresponding points.

Accordingly, the display apparatus 500 may identify corresponding points from multi-view images that are generated in association with sensor data selected based on the reference distance, and may acquire a depth image of the object having depth information corresponding to the corresponding points.

According to another embodiment, the display apparatus 500 may obtain depth information associated with an edge of a refocused image.

In this embodiment, the display apparatus 500 may estimate the reference distance in operation 1310, and may generate multi-view images of the object using sensor data selected based on the estimated reference distance in operation 1320. Operations 1310 and 1320 may refer to the description made above according to the embodiment and thus, a further detailed description will be omitted here.

After performing operations 1310 and 1320, the display apparatus 500 may generate refocused images using multi-view images in operation 1340. In operation 1340 the display apparatus 500 may shift each multi-view image using a pixel unit, based on a center image among the multi-view images, and may generate, as a refocused image, an image that overlaps the center image according to the shift. Each refocused image may be an image in which a portion of the object is sharply expressed based on a shifted pixel value.

For example, by sequentially shifting all of the multi-view images excluding the center image using a pixel unit, based on the center image, the display apparatus 500 may generate any one or more of a refocused image in which a finger of the object is sharply expressed, a refocused image in which a palm of the object is sharply expressed, a refocused image in which a wrist of the object is sharply expressed, and a refocused image in which a forearm of the object is sharply expressed.

In operation 1350, the display apparatus 500 may generate a depth image using a boundary. In operation 1350, the display apparatus 500 may generate depth information associated with an edge of the refocused image. The display apparatus 500 may generate a second depth image of the refocused images by matching the respective refocused images using boundaries within the refocused images.

For example, as described above with reference to FIG. 11, the display apparatus 500 may acquire the second depth image of the object by combining, into a single image using a DFF scheme, boundary images associated with edges that include a finger, a palm, a wrist, and a forearm of the object that are focused in four refocused images, respectively.

Accordingly, the display apparatus 500 may acquire a depth image of the object that optimally expresses the respective feature portions of the object and has depth information by generating and combining refocused images having a relatively high edge value with respect to predetermined feature portions of the object, using multi-view images that are generated in association with the reference image.

The display apparatus 500 may acquire the depth image of the object by recombining the first depth image and the second depth image.

The display apparatus 500 may estimate the reference distance in operation 1310, may generate the multi-view images and the first depth image in operations 1320 and 1330, and may generate the refocused images and the second depth image in operations 1340 and 1350. Operations 1310 through 1350 may refer to any of the embodiments described above and thus, a further detailed description will be omitted here.

In operation 1360, the display apparatus 500 may acquire the depth image of the object using the multi-view images and the refocused images. In operation 1360, the display apparatus 500 may acquire the depth image of the object using depth information associated with points of the multi-view images and depth information associated with edges of the refocused images.

For example, the display apparatus 500 may generate the depth image of the object by recombining the first depth image combined in association with the multi-view images and the second depth image combined in association with the refocused images.

In the case of recombining the first depth image and the second depth image, the display apparatus 500 may match and combine the first depth image in which internal points of corresponding feature portions of the body are sharply expressed and the second depth image in which edges of the predetermined portions are sharply expressed. For example, as described above with reference to FIG. 12, the display apparatus 500 may combine the first depth image and the second depth image to make it possible to express a boundary between the hand and the arm of the object through the second depth image and to express internal points of the hand and the arm of the object through the first depth image.

According to an embodiment, the depth information obtaining method may generate a more precise depth image by variably selecting a sensor area from a coded sensor area using a coded aperture image of a lensless scheme, by generating multi-view images and refocused images, and by combining the multi-view images and the refocused images.

According to an embodiment, since an object recognition disabled area such as a conventional shadowing area is absent, the depth information obtaining method may estimate a depth regardless of a distance from the object and thus, may be applied to all of the fields in which a 3D image is used, such as touch, high resolution scanning, spatial manipulation, and the like, for example.

According to an embodiment, in the case of being combined with a 3D display, the depth information obtaining method may provide a user with a realistic interaction that allows the user to feel a 3D effect by generating a depth image that appears as if a hand of the user manipulating an object outside screen is captured in front of the screen.

The above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like.

Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa. Any one or more of the software modules described herein may be executed by a controller such as a dedicated processor unique to that unit or by a processor common to one or more of the modules. The described methods may be executed on a general purpose computer or processor or may be executed on a particular machine such as the apparatusses described herein.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. A method of obtaining depth information using a display apparatus comprising a display panel and a sensor panel, the method comprising:
   adjusting a sensor area of the sensor panel based on a reference distance,
   wherein the sensor area comprises a side having a length, and the adjusting comprises adjusting the length of the side of the sensor area based on the reference distance;
   obtaining depth information of an object based on the adjusted sensor area;
   detecting sensor data on a plurality of image capturing areas of the sensor panel;
   selecting, for each image capturing area, a quantity of image data for image decoding; and
   generating multi-view images of the object by decoding the selected quantity of image data for each respective image capturing area,
   wherein the reference distance refers to a distance of the display apparatus from the object,
   wherein in the adjusting of the sensor area, the length of the side of the sensor area is decreased according to an increase in a distance estimated from the object as the reference distance, and
   wherein the reference distance is estimated from among a plurality of candidate distances, wherein each candidate distance of the plurality of candidate distances is used to generate a respective candidate image, and
   selecting, as the reference distance, a candidate distance of the plurality of candidate distances used to generate a respective candidate image having a highest degree of definition from among the candidate images respectively generated based on each candidate distance.

2. A method of obtaining depth information of an object using a display apparatus comprising a display panel and a sensor panel, the method comprising:
   estimating a reference distance, wherein the reference distance refers to a distance of the display apparatus from the object;
   selecting sensor data from a sensor area of the sensor panel that changes based on the reference distance;
   generating multi-view images of the object using the sensor data;
   extracting partial images of the object from the multi-view images; and
   acquiring a depth image of the object using the multi-view images by combining the partial images from the multi-view images,
   wherein the sensor area comprises a side having a length, and the length of the side of the sensor area is decreased according to an increase in a distance estimated from the object as the reference distance, and
   wherein the reference distance is estimated from among a plurality of candidate distances, wherein each candidate distance of the plurality of candidate distances is used to generate a respective candidate image, and
   selecting, as the reference distance, a candidate distance of the plurality of candidate distances used to generate a respective candidate image having a highest degree of definition from among the candidate images respectively generated based on each candidate distance.

3. The method of claim 2, wherein the acquiring of the depth image comprises:
   determining corresponding points of the object; and
   acquiring the depth image by matching the multi-view images using the corresponding points.

4. The method of claim 2, further comprising:
   generating a plurality of refocused images using the multi-view images,
   wherein the acquiring of the depth image comprises acquiring the depth image of the object using the plurality of refocused images.

5. The method of claim 4, wherein the generating of the plurality of refocused images comprises:
   shifting each of the multi-view images using a pixel unit, based on a center image among the multi-view images; and
   generating, as a refocused image, an image overlapping the center image according to the shift.

6. The method of claim 5, wherein the refocused image is an image that sharply expresses a portion of the object based on a shifted pixel value.

7. The method of claim 4, wherein the acquiring of the depth image of the object using the plurality of refocused images comprises:
   determining a boundary in each of the plurality of refocused images; and
   acquiring the depth image by matching a corresponding refocused image using the boundary.

8. The method of claim 2, wherein the selecting of the sensor data comprises selecting the sensor data by changing the quantity of sensor data based on the estimated reference distance.

9. The method of claim 8, wherein the quantity of sensor data decreases according to an increase in the reference distance.

10. The method of claim 2, wherein the estimating of the reference distance comprises:
    selecting a plurality of candidate distances; and
    determining the reference distance from among the plurality of candidate distances based on a degree of definition of an image that is generated in association with the sensor panel, in correspondence with each of the plurality of candidate distances.

11. The method of claim 10, wherein the determining of the reference distance comprises determining that the degree of definition of the image is high when a relatively small amount of blurs is included in the image.

12. The method of claim 10, wherein the determining of the reference distance comprises:
    selecting candidate sensor data from the sensor panel based on the plurality of candidate distances; and
    calculating a mean absolute gradient (MAG) value as a degree of definition of an image that is generated using the candidate sensor data.

13. The method of claim 12, wherein the calculating of the MAG value comprises:
    generating a first image by decoding the candidate sensor data;
    generating a second image by performing non-local means with respect to the first image;

generating a third image by performing binarization with respect to the second image; and calculating a MAG value of the third image.

14. A method of estimating depth information of an object using a display apparatus comprising a display panel and a sensor panel, the method comprising:
 generating multi-view images of the object using sensor data that is selected from a sensor area of the sensor panel that changes based on a reference distance, wherein the reference distance refers to a distance of the display apparatus from the object;
 generating a plurality of refocused images using the multi-view images; and
 acquiring a depth image of the object using first depth information associated with points of the generated multi-view images and second depth information associated with edges of the plurality of refocused images;
 wherein the sensor area comprises a side having a length, and the length of the side of the sensor area is decreased according to an increase in a distance estimated from the object as the reference distance, and
 wherein the reference distance is estimated from among a plurality of candidate distances, wherein each candidate distance of the plurality of candidate distances is used to generate a respective candidate image, and
 selecting, as the reference distance, a candidate distance of the plurality of candidate distances used to generate a respective candidate image having a highest degree of definition from among the candidate images respectively generated based on each candidate distance.

15. The method of claim 14, wherein the acquiring of the depth image comprises:
 generating a first depth image with respect to the multi-view images by matching the multi-view images using corresponding points of the object;
 generating a second depth image with respect to the refocused images by matching the refocused images using boundaries within the refocused images; and
 acquiring the depth image by combining the first depth image and the second depth image.

16. A display apparatus comprising a display panel and a sensor panel, the display apparatus comprising:
 a reference distance estimating unit to estimate a reference distance, wherein the reference distance refers to a distance of the display apparatus from an object;
 a sensor data selecting unit to select sensor data from a sensor area of the sensor panel that changes based on the reference distance;
 a data decoding unit to generate multi-view images of the object using the sensor data, and to extract partial images of the object from the multi-view images; and
 a depth acquiring unit to acquire a depth image of the object using the multi-view images, by combining the partial images from the multi-view images,
 wherein the sensor area comprises a side having a length, and the length of the side of the sensor area is decreased according to an increase in a distance estimated from the object as the reference distance, and
 wherein the reference distance is estimated from among a plurality of candidate distances, wherein each candidate distance of the plurality of candidate distances is used to generate a respective candidate image, and
 selecting, as the reference distance, a candidate distance of the plurality of candidate distances used to generate a respective candidate image having a highest degree of definition from among the candidate images respectively generated based on each candidate distance.

17. The display apparatus of claim 16, wherein the depth acquiring unit determines corresponding points of the object, and acquires the depth image by matching the multi-view images using the corresponding points.

18. The display apparatus of claim 16, wherein:
 the data decoding unit generates a plurality of refocused images using the multi-view images, and
 the depth acquiring unit acquires the depth image of the object using the plurality of refocused images.

19. The display apparatus of claim 18, wherein the data decoding unit shifts each of the multi-view images using a pixel unit, based on a center image among the multi-view images, and generates, as a refocused image, an image overlapping the center image according to the shift.

20. The display apparatus of claim 19, wherein the refocused image is an image that sharply expresses a portion of the object based on a shifted pixel value.

21. The display apparatus of claim 18, wherein the depth acquiring unit determines a boundary in each of the plurality of refocused images, and acquires the depth image by matching a corresponding refocused image using the boundary.

22. The display apparatus of claim 16, wherein the sensor data selecting unit selects the sensor data by changing the quantity of sensor data based on the reference distance.

23. The display apparatus of claim 22, wherein the quantity of sensor data decreases according to an increase in the reference distance.

24. The display apparatus of claim 16, wherein the reference distance estimating unit selects a plurality of candidate distances, and determines the reference distance from among the plurality of candidate distances based on a degree of definition of an image that is generated in association with the sensor panel in correspondence to each of the plurality of candidate distances.

25. The display apparatus of claim 24, wherein the reference distance estimating unit determines that the degree of definition of the image is high when a relatively small amount of blurs is included in the image.

26. The display apparatus of claim 24, wherein the reference distance estimating unit selects candidate sensor data from the sensor panel based on the plurality of candidate distances, and calculates a mean absolute gradient (MAG) value as degree of definition of an image that is generated using the candidate sensor data.

27. The display apparatus of claim 26, wherein the reference distance estimating unit generates a first image by decoding the candidate sensor data, generates a second image by performing non-local means with respect to the first image, generates a third image by performing binarization with respect to the second image, and calculates a MAG value of the third image.

28. The display apparatus of claim 16, wherein
 the display panel comprises a plurality of pixels, and
 the display apparatus further comprises a processor to control the display panel to operate in a display mode during a first predetermined period of time and to operate in an image capturing mode during a second predetermined period of time.

29. The display apparatus of claim 28, wherein the display panel further comprises a sensor panel for capturing an image during the image capturing mode.

30. The display apparatus of claim 29, wherein during the first period of time, the display panel displays a broadcast image signal using the plurality of pixels and during the second period of time the display panel allows outside light to pass through the display panel to the sensor panel wherein the sensor panel acquires sensor data based on the outside light.

31. The display apparatus of claim 16, wherein:
the display panel comprises a plurality of pixels,
the sensor panel is positioned behind the display panel for capturing an image, and
the display apparatus further comprises a processor to control the display panel to simultaneously display an image signal using the plurality of pixels and allow outside light to pass through the display panel to the sensor panel so that the sensor panel may capture an image using the outside light while the image signal is displayed by the display panel.

32. A display apparatus comprising a display panel and a sensor panel, the display apparatus comprising:
a data decoding unit to generate multi-view images of the object using sensor data that is selected from a sensor area of the sensor panel that changes based on a reference distance, and to generate a plurality of refocused images using the multi-view images, wherein the reference distance refers to a distance of the display apparatus from the object; and
a depth acquiring unit to acquire a depth image of the object using first depth information associated with points of the generated multi-view images and second depth information associated with edges of the plurality of refocused images,
wherein the sensor area comprises a side having a length, and the length of the side of the sensor area is decreased according to an increase in a distance estimated from the object as the reference distance, and
wherein the reference distance is estimated from among a plurality of candidate distances, wherein each candidate distance of the plurality of candidate distances is used to generate a respective candidate image, and
selecting, as the reference distance, a candidate distance of the plurality of candidate distances used to generate a respective candidate image having a highest degree of definition from among the candidate images respectively generated based on each candidate distance.

33. The display apparatus of claim 32, wherein the depth acquiring unit generates a first depth image with respect to the multi-view images by matching the multi-view images using corresponding points of the object, generates a second depth image with respect to the refocused images by matching the refocused images using boundaries within the refocused images, and acquires the depth image by combining the first depth image and the second depth image.

34. A method of obtaining depth information of an object using a display apparatus comprising a display panel and a sensor panel, the method comprising:
estimating a reference distance, wherein the reference distance refers to a distance of the display apparatus from the object;
selecting sensor data from a sensor area of the sensor panel that changes based on the reference distance;
generating, by way of a processor, a first depth image by combining multi-view images generated using the sensor data;
generating a second depth image by combining multi-view images acquired by combining refocused images generated using the multi-view images; and
acquiring a depth image of the object by recombining the first depth image and the second depth image,
wherein the sensor area comprises a side having a length, and the length of the side of the sensor area is decreased according to an increase in a distance estimated from the object as the reference distance, and
wherein the reference distance is estimated from among a plurality of candidate distances, wherein each candidate distance of the plurality of candidate distances is used to generate a respective candidate image, and
selecting, as the reference distance, a candidate distance of the plurality of candidate distances used to generate a respective candidate image having a highest degree of definition from among the candidate images respectively generated based on each candidate distance.

* * * * *